United States Patent
Franca-Neto

(10) Patent No.: US 10,644,958 B2
(45) Date of Patent: May 5, 2020

(54) ALL-CONNECTED BY VIRTUAL WIRES NETWORK OF DATA PROCESSING NODES

(71) Applicant: HGST Netherlands B.V., Amsterdam (NL)

(72) Inventor: Luiz M. Franca-Neto, Sunnyvale, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 313 days.

(21) Appl. No.: 15/011,538

(22) Filed: Jan. 30, 2016

(65) Prior Publication Data

US 2017/0222945 A1    Aug. 3, 2017

(51) Int. Cl.
*H04L 12/24* (2006.01)
*H04L 29/08* (2006.01)
(Continued)

(52) U.S. Cl.
CPC ............ *H04L 41/12* (2013.01); *G06F 13/372* (2013.01); *G06F 13/4068* (2013.01);
(Continued)

(58) Field of Classification Search
CPC ............... H04L 29/08144; H04L 29/06; H04L 29/08072; H04L 29/08171; H04L 12/5695;
(Continued)

(56) References Cited

U.S. PATENT DOCUMENTS

| | | | | |
|---|---|---|---|---|
| 4,811,365 A | * | 3/1989 | Manno ................. | H04B 7/2126 370/504 |
| 5,335,228 A | * | 8/1994 | Bottiglieri ............ | H04J 3/0605 370/509 |

(Continued)

FOREIGN PATENT DOCUMENTS

CN            102638411 A       8/2012

OTHER PUBLICATIONS

Halperin, Daniel et al. Augmenting Data Center Networks with Multi-Gigabit Wireless Links SIGCOMM'11, Aug. 15-19, 2011, Toronto, Ontario, Canada.
(Continued)

*Primary Examiner* — Mahran Y Abu Roumi
(74) *Attorney, Agent, or Firm* — Patterson & Sheridan, LLP

(57) ABSTRACT

Embodiments of the present disclosure generally relate to a cloud computing network and a method of transferring information among processing nodes in a cloud computing network. In one embodiment, a cloud computing network is disclosed herein. The cloud computing network includes a plurality of motherboards arranged in racks. Each individual motherboard includes a central hub and a plurality of processing nodes equipped to the central hub. Each processing node is configured to access memory or storage space of another processing node in the same motherboard by intermediation of the hub. The access is called a communication between a pair of processing nodes. The communication includes a string of information transmitted between processing nodes. The string of information has a plurality of frames. Each frame includes a plurality of time slots, wherein each time slot is allotted a specific node pair.

8 Claims, 9 Drawing Sheets

(51) Int. Cl.
  H04L 12/40  (2006.01)
  G06F 13/40  (2006.01)
  G06F 13/372 (2006.01)
(52) U.S. Cl.
  CPC ........ *H04L 12/40123* (2013.01); *H04L 67/10* (2013.01); *H04L 67/12* (2013.01); *H04L 41/0823* (2013.01)
(58) Field of Classification Search
  CPC ... H04W 28/04; H04W 72/04; H04W 5/0007; H04W 72/042; H04W 88/08
  USPC ......................................................... 709/226
  See application file for complete search history.

(56) References Cited

U.S. PATENT DOCUMENTS

| | | | |
|---|---|---|---|
| 6,417,943 | B1 | 7/2002 | Saraswat et al. |
| 6,529,960 | B2* | 3/2003 | Chao ..................... H04L 1/1809 370/394 |
| 7,218,616 | B2 | 5/2007 | Karim |
| 7,433,363 | B2 | 10/2008 | Rosen et al. |
| 7,581,081 | B2 | 8/2009 | Gonzalez et al. |
| 7,620,736 | B2 | 11/2009 | Westfall |
| 8,014,401 | B2 | 9/2011 | Radulescu |
| 8,370,551 | B2 | 2/2013 | Ohmacht et al. |
| 8,739,179 | B2 | 5/2014 | Tripathi |
| 8,811,378 | B2 | 8/2014 | Benner et al. |
| 8,897,184 | B2 | 11/2014 | Pettus et al. |
| 8,972,601 | B2 | 3/2015 | Padhye et al. |
| 2005/0058149 | A1* | 3/2005 | Howe ..................... H04L 47/10 370/428 |
| 2005/0132089 | A1 | 6/2005 | Bodell et al. |
| 2008/0186998 | A1 | 8/2008 | Rijpkema |
| 2009/0141656 | A1* | 6/2009 | Fan ................... H04L 29/12009 370/254 |
| 2011/0243074 | A1* | 10/2011 | Shin ..................... H04B 10/803 370/329 |
| 2013/0250802 | A1 | 9/2013 | Yalagandula et al. |
| 2014/0133487 | A1 | 5/2014 | Margalit et al. |
| 2014/0133493 | A1* | 5/2014 | Miliavsky ............... H04L 49/00 370/406 |
| 2014/0177742 | A1* | 6/2014 | Maltsev ............... H04B 7/0408 375/260 |
| 2014/0375528 | A1 | 12/2014 | Ling |
| 2016/0179718 | A1* | 6/2016 | Morris .................... G06F 13/28 710/308 |
| 2017/0033902 | A1* | 2/2017 | Border ................. H04W 28/06 |
| 2017/0083337 | A1* | 3/2017 | Burger ................. G06F 9/3004 |

OTHER PUBLICATIONS

Vardhan, Hars et al. 60 GHz Wireless Links in Data Center Networks.

Zhou, Xia et al. Mirror on the Ceiling: Flexible Wireless Links for Data Centers SIGCOMM'12, Aug. 13-17, 2012, Helsinki, Finland.

On the Feasibility of Completely Wireless Data Centers Paper #22, 14 pages.

Ramachandran, Kishore et al. 60 GHz Data-Center Networking: Wireless—Worry Less? WINLAB, Rutgers University, North Brunswick, NJ; NEC Laboratories American, Princeton, NJ, Jul. 14, 2008.

Introduction to Millimeter Wave Wireless Communications <http://www.informit.com/articles/article.aspx?p=2249780&seqNum=3>.

Wireless data center networking with steered-beam mmWave links <http://ieeexplore.ieee.org/xpl/login.jsp?tp=&arnumber=5779470>.

Time Division Multiplexing of Network Access by Security Groups in High Performance Computing Environments <http://repository.asu.edu/items/17929>.

Skywalk a Topology for HPC Networks with Low-delay Switches <http://navetics.hawaii.edu/~casanova/homepage/papers/fujiwara.ipdps2014.pdf>.

Swap-and-randomize_ A Method for Building Low-latency HPC Interconnects http://www.computer.org/csdl/trans/td/preprint/06860278-abs.html.

The PERCS High-Performance Interconnect <http://htor.inf.ethz.ch/publicationsiimg/ibm-percs-network.pdf>.

Abts, Dennis and Kim, John—Synthesis Lectures on Computer Architecture #14 High Performance Datacenter Networks—Architectures, Algorithms, and Opportunities Morgan & Claypool Publishers 2011.

* cited by examiner

ALL-CONNECTED BY VIRTUAL WIRES NETWORK OF DATA PROCESSING NODES

BACKGROUND OF THE DISCLOSURE

Field of the Disclosure

Embodiments of the present disclosure generally relate to a cloud computing network, a datacenter, and more specifically to an all-connected network of processing nodes.

Description of the Art

High performance computing (HPC) achieves record performance in data processing by the use of a low latency, proprietary, massive interconnect network among all processing nodes. HPC may apply to one application running on one operating system and using all available processing nodes. HPCs are priced at millions of dollars per installed realization.

Grid and cloud computing, in opposition, runs many applications on many operating systems. Being sensitive to cost, cloud computing uses largely available ingredients. For example, an assembly of servers, processors, memories, and storage using buses and I/O controllers may be used. All the servers in cloud computing are interconnected by largely available switches. For general purpose and lower cost realizations, Ethernet switches may be used. In high performance realization, InfiniBand switches may be used.

Switches in cloud computing, however, are responsible for large latencies when a network is heavily loaded compared to when the network is unloaded or lightly loaded. This is due to contention for resources in the switch and imply in packets of data being held in buffers or discarded.

Thus, there is a need for a low latency solution for interconnects that can be easily adopted in cloud computing.

SUMMARY OF THE DISCLOSURE

Embodiments of the present disclosure generally relate to a cloud computing network and a method of transferring information among processing nodes in a cloud computing network or datacenter. In one embodiment, a cloud computing network is disclosed herein. The cloud computing network includes a plurality of motherboards arranged in racks. Each individual motherboard includes a central hub and a plurality of processing nodes equipped to the central hub. Each processing node is configured to access memory or storage space of another processing node in the same motherboard by intermediation of the hub. The access is called a communication between a pair of processing nodes. The communication includes a string of information transmitted between processing nodes and said hub in the same motherboard, or between hubs at different motherboards. The string of information has a plurality of frames. Each frame includes a plurality of time slots, wherein each time slot is allotted a specific communicating pair.

In another embodiment, a method of transferring data in a cloud computing network is disclosed herein. The method includes allocating slots in a frame of information to specific pairs of processing nodes, transmitting a string information among processing nodes, and simultaneously transmitting a signal data frame while transmitting information among the processing nodes to separate frames in the information transmitted.

In another embodiment, a method of transferring data in a cloud computing network is disclosed herein. The method includes allocating slots in a frame of information to specific pairs of processing nodes, transmitting a string of information among processing nodes, wherein the string of information is transmitted through transmission of the string of information from the processing nodes to a central hub, transmitting the information from the central hub to a respective processing node, and simultaneously transmitting a signal data frame while transmitting information to the central hub and transmitting the information to the central hub from the central hub to the respective processing node to separate frames in the information transmitted.

At the physical level, all communications taught in this application are based on point-to-point electrical signaling.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1:
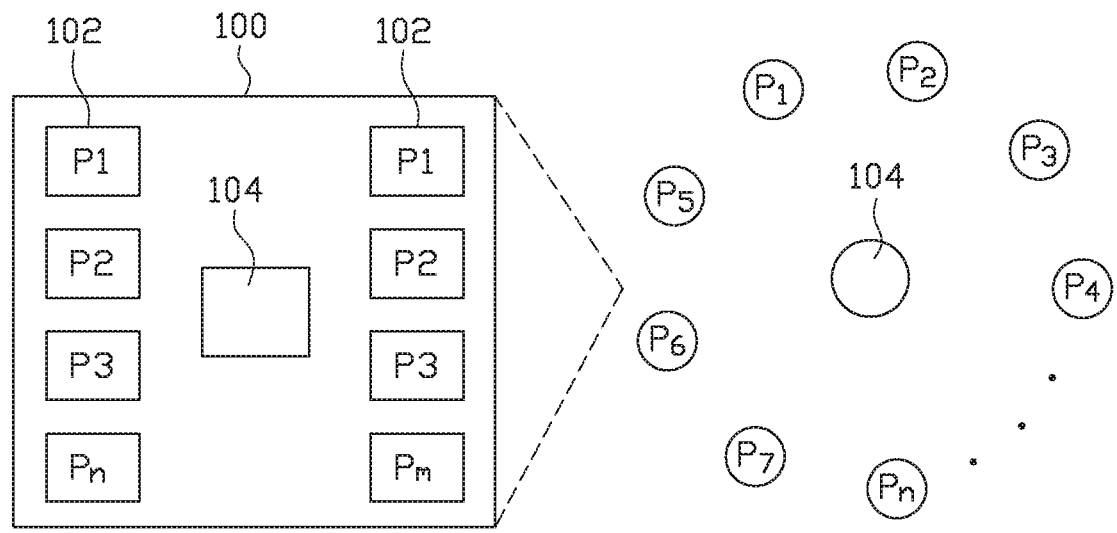
FIG. 1 illustrates a motherboard with processing nodes and a hub using a ring interconnection topology, according to one embodiment.

Embodiments of the present disclosure generally relate to a cloud computing network and a method of transferring information among processing nodes in a cloud computing network. A processing node in such an environment is a node with processor and memory (DRAM). These processing nodes can be physically placed on a printed circuit board (PCB), a daughtercard or a motherboard. In one embodiment, for illustrative purpose, not limiting in any sense, a motherboard may contain several processing nodes as illustrated in FIG. 1. Accordingly, a hub chip, or set of chips, working as a hub routes the communication between those processing nodes.

Figure 2:
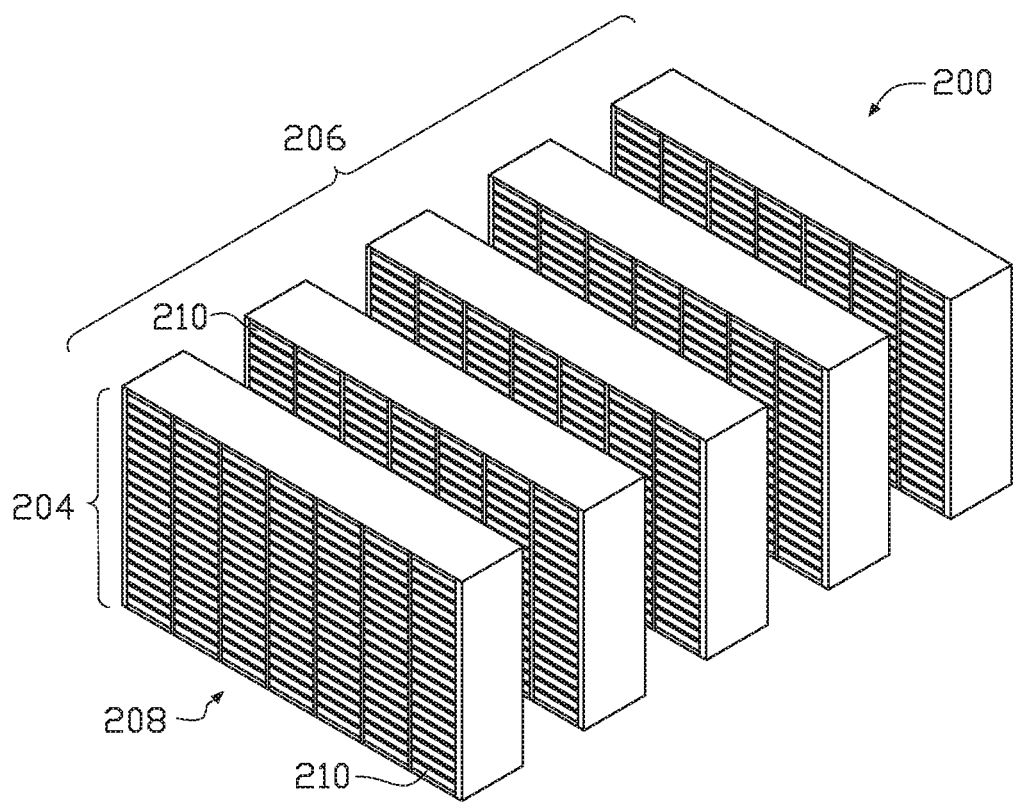
FIG. 2 illustrates a data center for a cloud computing network, according to one embodiment.

A set of motherboards, each having several processing nodes, can be arranged vertically as server blade boards in a rack, or can be arranged horizontally in a horizontal stacked, as illustrated in FIG. 2. In this illustration, the communication from one rack to another is made using point-to-point wireless links as indicated by the two-headed arrow lines. These wireless links make a daisy chain in the direction indicated in FIG. 2.

Figure 3:
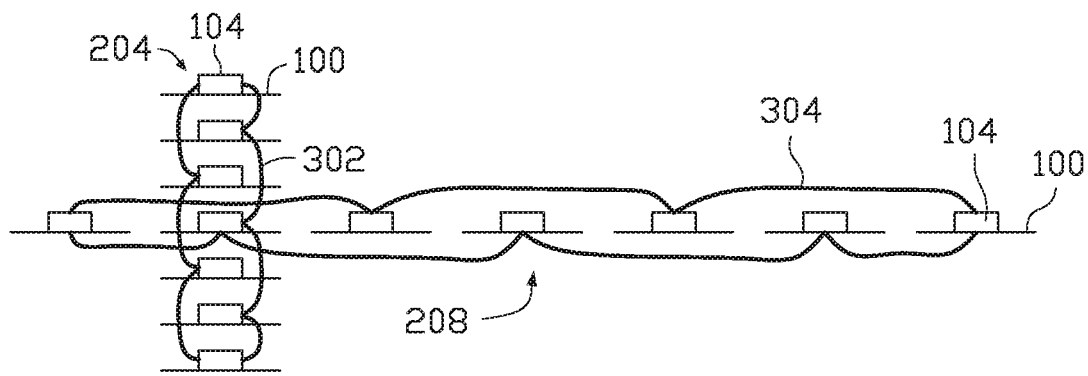
FIG. 3 illustrates an enlarged view of a motherboard with hubs making a ring interconnection network in a set of data center racks, according to one embodiment.

In the embodiments shown in FIGS. 1 and 2, the hub chip, or set of chips working as a hub in each motherboard, communicate with other hubs in the same rack or in laterally placed racks, as shown in FIG. 3. In this embodiment, the hubs form a communication ring with other hubs in different motherboards in the same rack or in neighbor racks. Hubs form a daisy chain connected by wireless links in the direction across the aisles in the datacenter, as illustrated in FIG. 2.

Figure 4:
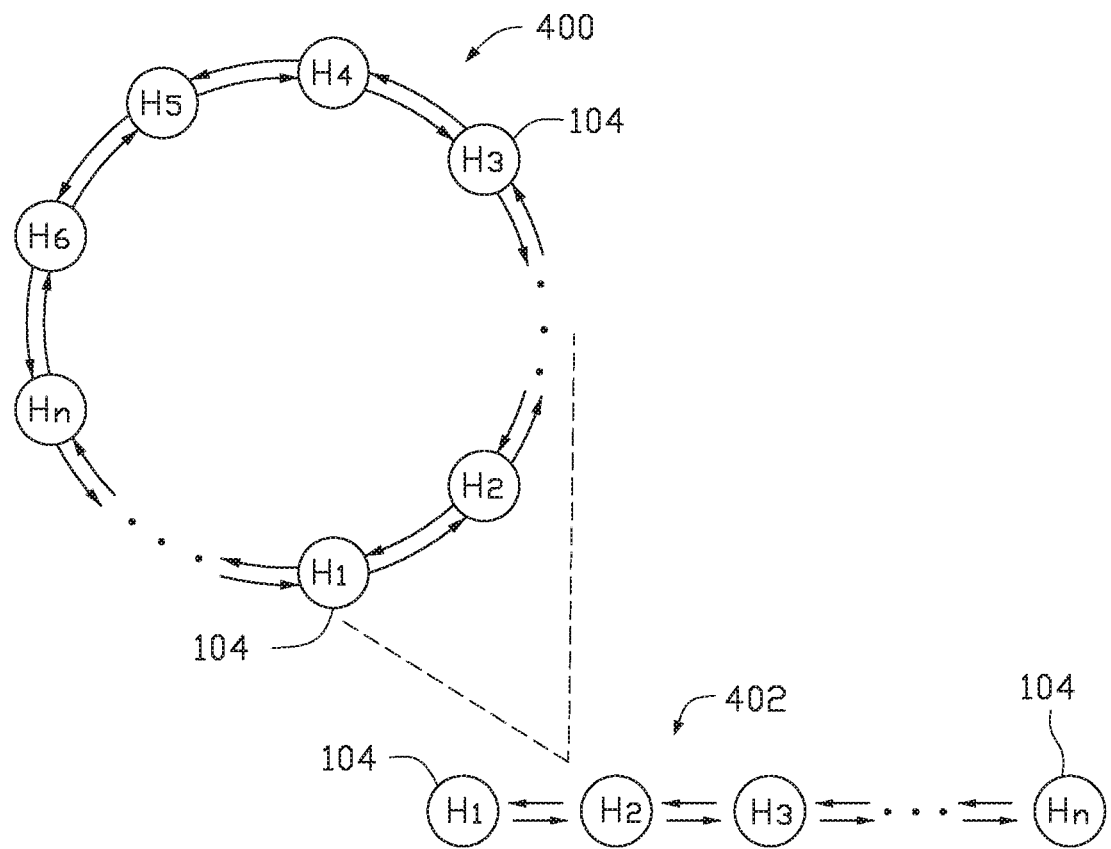
FIG. 4 illustrates the bidirectional communications between hubs in both ring and linear arrangements, according to one embodiment.

In a ring or in a line, hubs relay communications from the source processing nodes to a receiving processing nodes in a datacenter. Communication links between hubs are shown in FIG. 4 for both ring and line topologies. All these communications, as shown, are physically supported by point-to-point electrical signaling.

Those skilled in the art will recognize that while this document refers to "motherboards" stacked in racks, the concept is readily extended to mean "servers" horizontally stacked in racks, or "blade servers" vertically oriented and placed in racks.

Each processing node is fully connected to any other processing node in a datacenter using the virtual circuits taught in this disclosure. Said virtual circuits are realized by time slots in the communication between processing nodes and hubs, and also between hubs relaying information to other hubs towards the target processing node.

FIG. 1 illustrates how processing nodes 102 can be realized in a motherboard 100 with a central hub 104 to support communications between them. A processing node 102 may contain a processor with multiple cores, or a multi-socket processor, which accesses its own local memory directly without depending on the hub 104. Each processing node 102 is configured to access memory of other processing nodes 102 in the same motherboard 100 by intermediation of the hub 104 in their motherboard 100. A single hub 104 is thus used to support this non-local same motherboard memory access. Those skilled in the art will recognize that the motherboard 100 can also be featured with solid-state non-volatile memory (NVM) storage accessible by each processing node 102 as local storage space directly or as remote storage space by intermediation of the hub 104 in the motherboard 100.

Once the motherboards, such as motherboard 100, are arranged in racks forming columns (as shown in FIG. 2), a processing node 102 can reach memory of another processing nodes in different motherboards, in any place inside the datacenter. In such a case, the intermediation of more than one hub is necessary.

Those skilled in the art will recognize that each of the hubs 104 in this disclosure has a direct interface to all memory available in the motherboard 100 where the hub 104 reside. Thus, the teachings of this disclosure focus on the physical level signaling required to create communication channels (a) between those hubs and the processing nodes in the same motherboard and (b) between hubs in different motherboards. As illustration and not meant to be limiting, a hub topology is taught for these communications.

FIG. 2 illustrates a data center 200 for a cloud computing network, according to one embodiment. The data center 200 includes a plurality of motherboards 100. The plurality of motherboards 100 are positioned in a plurality of racks 204. The plurality of racks 204 of motherboards 100 are arranged in a grid-like structure having columns 206 and rows 208. The motherboards 100 in each rack 204 are electrically connected. The racks 204 are electrically connected within the column 206. The rows 208 of racks 204 are virtually connected across the row 208. Each motherboard 100 may include a virtual connector 210 configured to virtually connect rows 208 of racks 204 of motherboards 100 across a row 208. In one embodiment, the virtual connector 210 may be an RF transmitter/receiver.

FIG. 3 shows details of how the hubs in different motherboards in a rack can make a ring in the vertical direction 302. The ring is "collapsed" in order to be realized in a linear vertical arrangement 304 of hubs (red ring). Analogously, a ring configuration of hubs across a horizontal direction using motherboards of neighbor racks in the same aisle is also "collapsed" into a linear horizontal arrangement of hubs (green ring). The skilled in the art will recognize that any other motherboard in the racks can be made part of a ring in the vertical and horizontal direction as in well-known Torus arrangement.

FIG. 4 illustrates the bidirectional communications between hubs in both ring 400 and linear 402 arrangement. Those skilled in the art will recognize that, in a ring 400, a hub 104 can reach another hub 104 by signaling in two possible directions. A hub 104 will try first to signal in the direction that implies a smaller number of relaying hubs to reach its target hub.

Figure 5:
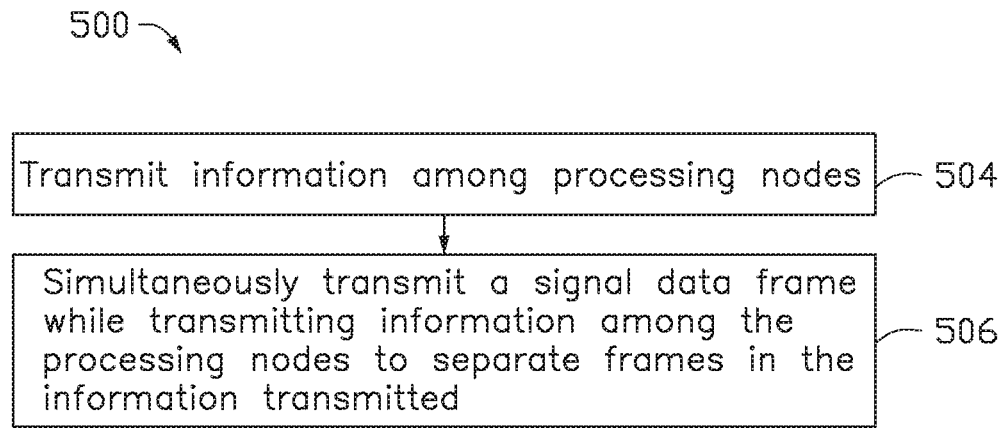
FIG. 5 illustrates a method of transferring data in a cloud computing network between processing nodes, according to one embodiment.

FIG. 5 illustrates a method 500 of transferring data in a cloud computing network between processing nodes.

At step 504, information is transmitted among the processing nodes. The information transmitted among the processing nodes is sent in successive frames of information. At step 506, a signal data frame is transmitted simultaneously with the transmitted information among the processing nodes. The signal data frame separates the frames in the information transmitted. For example, the signal data frame has a half-wavelength that is the size of the length of the data frame to signal to the nodes that a single frame of information has passed. The signal data frame improves latency by allowing information to be transmitted in successive frames without the need for a header.

Figure 6A:
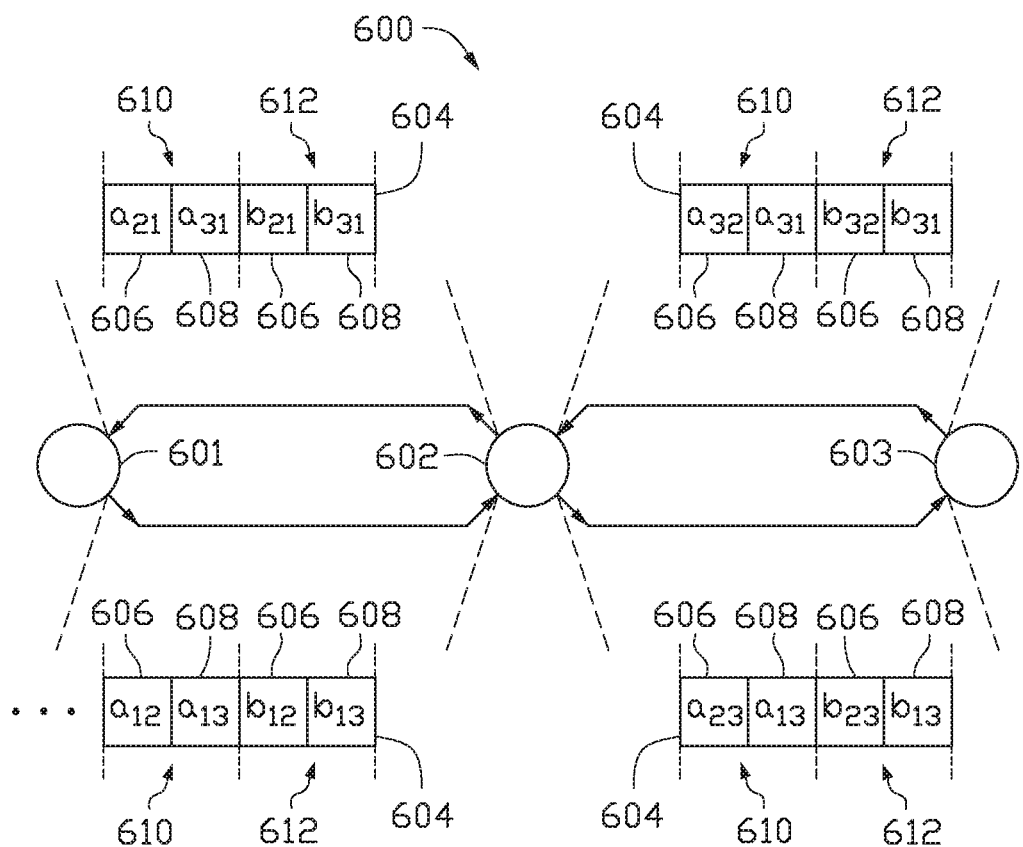
FIGS. 6A-6B illustrate an example of transferring data in a cloud computing network among three hubs in a line, according to one embodiment.
Figure 6B:
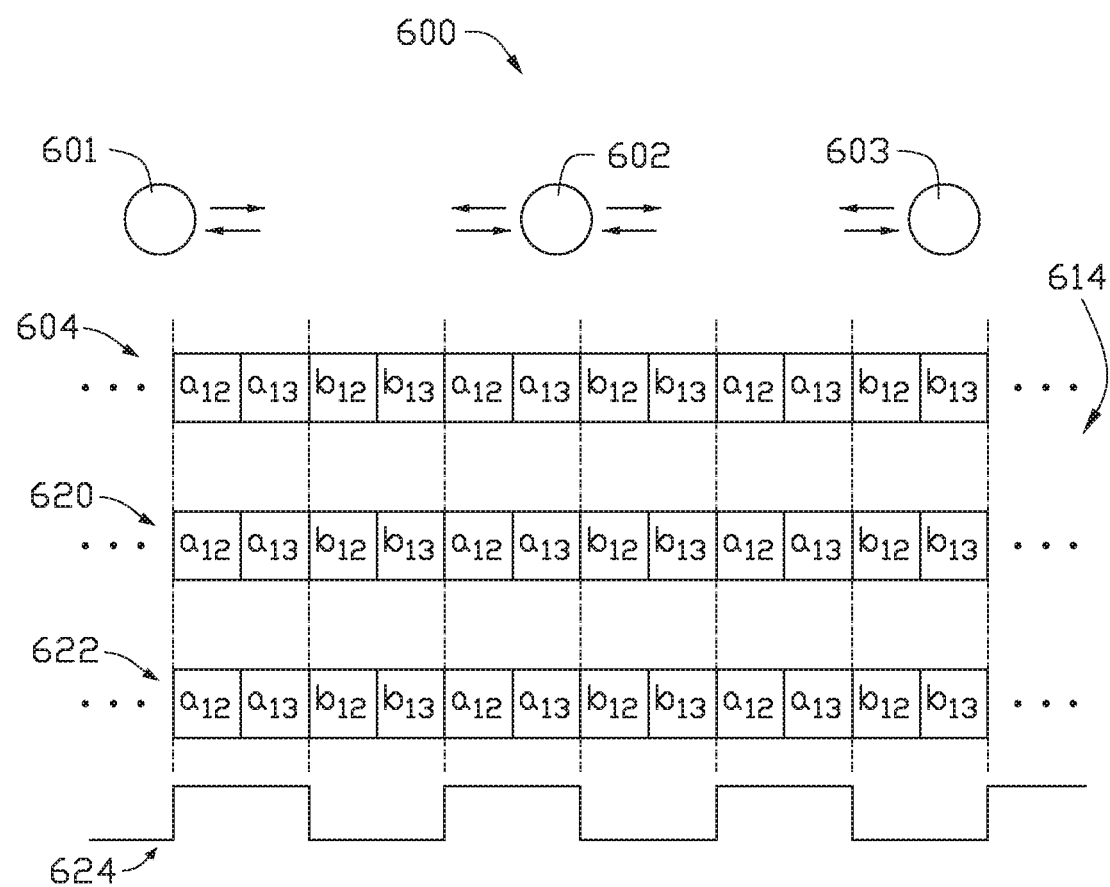

FIGS. 6A-6B illustrate an example of transferring data in a cloud computing network between rows of racks of motherboards, according to the method of FIG. 5.

FIG. 6A illustrates a line topology of a communication among three nodes 601, 602, and 603. A string 604 of information beginning at node 601 is sent among the nodes 602, 603. For such communication, each string 604 includes a plurality of time slots. The amount of time slots in each string is dependent on the number of nodes in the communication ring.

In FIG. 6A, the string 604 includes two time slots 606, 608 in each frame 610, 612. Each time slot 606, 608 is allotted a node pair for communication by a system manager. By allotting each slot 606, 608 a node pair, each node 601-603 does not have to make a decision regarding whether the time slot is allotted to that specific node. FIG. 6A illustrates a general example of node pair allotment for slots 606, 608.

Time slot 606 is initially assigned node pair 601, 602. Time slot 608 is initially assigned node pair 601, 603. As the string of information is sent from node 601 to node 602, a signal data frame (not shown) is sent simultaneously. The signal data frame indicates to node 602 when a single frame of information has passed. The signal data frame allows for information to be transmitted among processing nodes without the need for a header to inform the nodes where the two-bit frames are. When the string of information reaches node 602, node 602 absorbs the information meant for node 602. Namely, node 602 takes in two messages from node 601: $a_{12}$ and $b_{12}$. Time slot 606 is now assigned node pair 602, 603. Node 602 places information in time slot 606 for node 603.

The string 604 of information is sent from node 602 to node 603. As the string of information is sent from node 602 to node 603, the data signal frame is sent simultaneously. When the string 604 reaches node 603, node 603 absorbs the information meant for node 603. Specifically, node 603 takes in two messages from node 601, $a_{13}$ and $b_{13}$, and two messages from node 602, $a_{23}$ and $b_{23}$. Time slot 606 is now assigned node pair 603, 602. Time slot 608 is now assigned node pair 603, 601.

The string 604 of information is sent from node 603 to node 602. As the string of information is sent from node 603 to node 602, the signal data frame is sent simultaneously. When the string 604 reaches node 602, node 602 absorbs the information meant for node 602. Specifically, node 602 takes in two messages from node 603: $a_{32}$ and $b_{32}$. Time slot 606 is now assigned node pair 602, 601.

Communication may continue around the communication ring 600 with a signal data frame transmitted simultaneously with the information transmitted among the nodes. It is to be understood that the direction of the communication may be reversed such that the information travels "counterclockwise" around the ring. Additionally, different information may be transmitted in both the clockwise and counterclockwise directions.

The skilled in the art will recognize that each one of the point-to-point links shown in FIGS. 6A and 6B may comprise a number of parallel lines to augment throughput.

FIG. 6B illustrates the line topology 600 of the communication ring among three nodes 601-603 with parallel data lines 614. Multiple strings of information may be transmitted among the processing nodes 601-603 simultaneously. For example, as shown in FIG. 6B, string 604, 620, and 622 are transmitted simultaneously. A signal data frame 624, such as the signal data frame mentioned in FIG. 6A, is transmitted simultaneously with the strings 604, 620, and 622 of information.

The skilled in the art will recognize that each point-to-point link in FIG. 6A will comprise a number of parallel lines carrying the data in slots and an additional data frame signal companion and synchronized to those data lines.

Figure 7A:
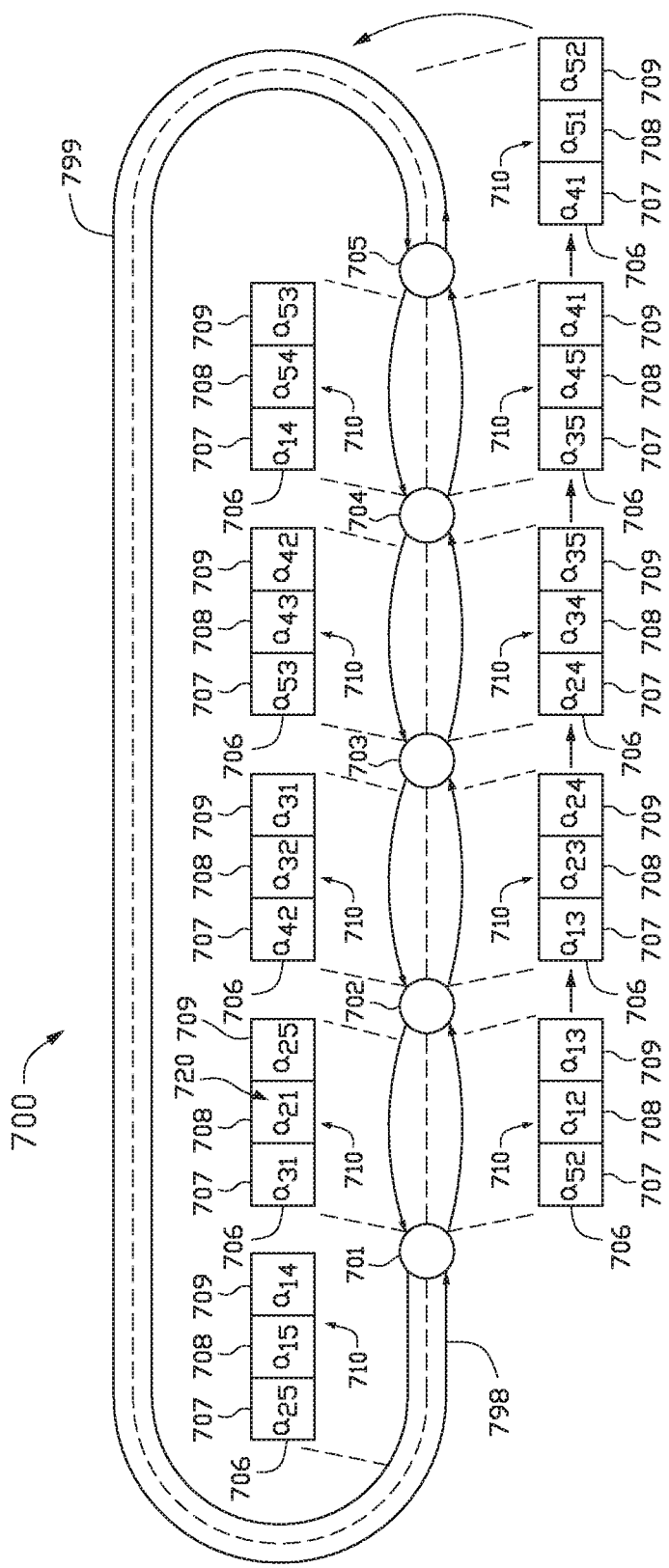
FIG. 7A illustrates an example of transferring data in a cloud computing network among hubs in a five node ring, according to one embodiment.

FIG. 7A illustrates an example of transferring data in a communication ring 700 having five nodes 701, 702, 703, 704, 705 with bi-directional communication in a first direction 798 and a second direction 799. A string 706 of information beginning at node 701 is sent among nodes 702-705 along the first direction 798. The string 706 includes three time slots 707, 708, 709 in each frame. In FIG. 7A, the string 706 includes one frame, frame 710. Each time slot 707-709 is allotted a node pair for communication by a system manager.

The skilled in the art will recognize that in ring with an odd number of nodes represented by (2N+1) nodes, the number of slots used in a communication according to this invention will be [N(N+1)]/2.

Time slot 707 is initially allotted node pair 705, 702. Time slot 708 is initially allotted node pair 701, 702. Time slot 709 is initially allotted node pair 701, 703. As the string 706 of information is transmitted from node 701 to node 702, a signal data frame (not shown) is sent simultaneously. The signal data frame allows for information to be transmitted among processing nodes without the need for a header to inform the nodes where the three-bit frames begin and end. When the string 706 of information reaches node 702, node 702 absorbs the information meant for node 702. Specifically, node 702 absorbs message $a_{52}$ from node 705 and message $a_{12}$ from node 701. Time slot 707 is now allotted node pair 701, 703. Time slot 708 is now allotted node pair 702, 703. Time slot 709 is now allotted node pair 702, 704.

The string of information is sent from node 702 to node 703. As the string of information is transmitted, the data signal frame is transmitted simultaneously. When the string 706 reaches node 703, node 703 absorbs the information meant for node 703. Specifically, node 703 takes in one message from node 701, $a_{13}$, and one message from node 702, $a_{23}$. Time slot 707 is now allotted node pair 702, 704. Time slot 708 is now allotted node pair 703, 704. Time slot 709 is now allotted node pair 703, 705.

The string 706 of information is sent from node 703 to node 704. As the string 706 is transmitted, the data signal frame is transmitted simultaneously. When the string 706 reaches node 704, node 704 absorbs the information meant for node 704. Specifically, node 704 receives one message from node 702, $a_{24}$, and receives one message from node 703, $a_{34}$. After node 704 receives its messages, time slot 707 is assigned node pair 703, 705; time slot 708 is assigned node pair 704, 705; and time slot 709 is assigned node pair 704, 701.

The string 706 of information is then sent from node 704 to node 705. As the string 706 is transmitted, the data signal frame is transmitted simultaneously. When the string 706 reaches node 705, node 705 absorbs the information sent to node 705. Specifically, node 705 receives one message from node 703, $a_{35}$, and one message from node 704, $a_{45}$. After node 705 receives its messages, time slot 707 is assigned node pair 704, 701; time slot 708 is assigned node pair 705, 701; and time slot 709 is assigned node pair 705, 702.

The string 706 of information may be also be sent in the reverse direction, along a second direction 799, from node 705 back to node 701. The allotted node pairs 720 are shown above each respective node 701-705.

In another embodiment, a packetized communication channel may be provided on top of the line topology 700. The communication channel is added by exploiting the habitability of the data frame signal to adaptively change the pulse length of the data frame signal arbitrarily without interfering with the semantics of the headerless signaling scheme, such as that illustrated in FIG. 7.

The communication channel extends communication between remote processing nodes to a datacenter scale. This may be done by injecting additional bits of information into the strings of information sent among processing nodes. The data frame signal can inject bits of the overlaid channel into the strings of information as often as every frame. When the data frame signal injects bits of the overlaid channel into the string, the data frame signal is extended for that specific frame in which the additional bits are added. Such a scenario is illustrated in FIG. 7B, using the five node structure discussed in FIG. 7A.

Figure 7B:
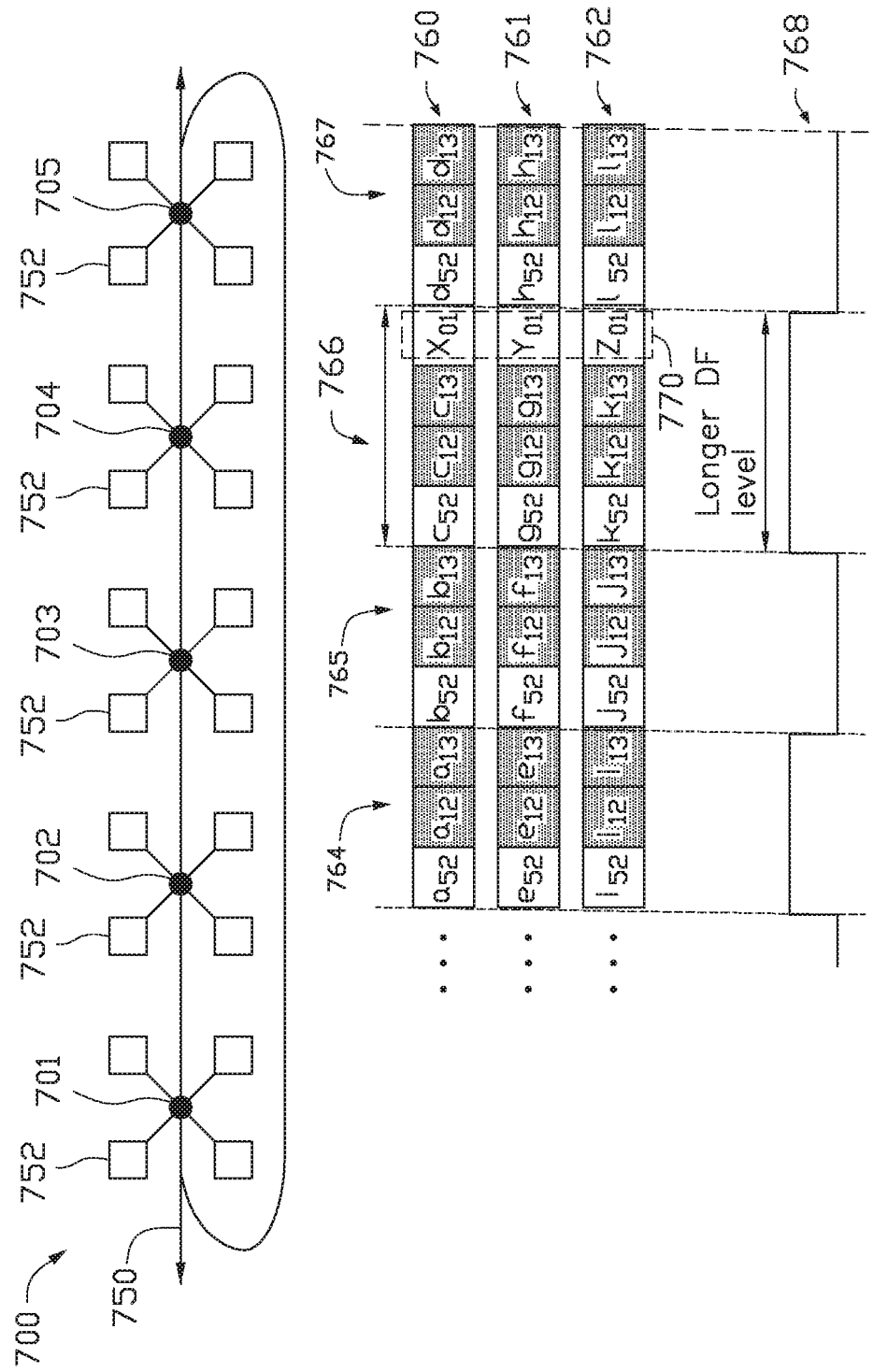
FIG. 7B illustrates the example in FIG. 7A with the addition of an overlay channel.

FIG. 7B includes a communication channel 750 on top of the line topology 700. The nodes 701-705 are shown as hubs with a plurality of processing nodes 752 extending from each hub 701-705. When a processing node 752 in a first hub wants to communicate with a processing node 752 in a second hub, the data frame signal may extend a frame of information by an additional bit to include such message. As shown in FIG. 7B, strings of information 760, 761, 762 are sent in parallel among the hubs 701-705. Each string is shown to include frames 764, 765, 766, 767. In frame 766, the number of time slots has been increased to include a message from the processing node 752 in the first hub 701 to the processing node 752 in the second hub 702. This is illustrated as time slot 770. Additionally, the wavelength of the data frame signal 768 is increased to account for this message.

Figure 8:
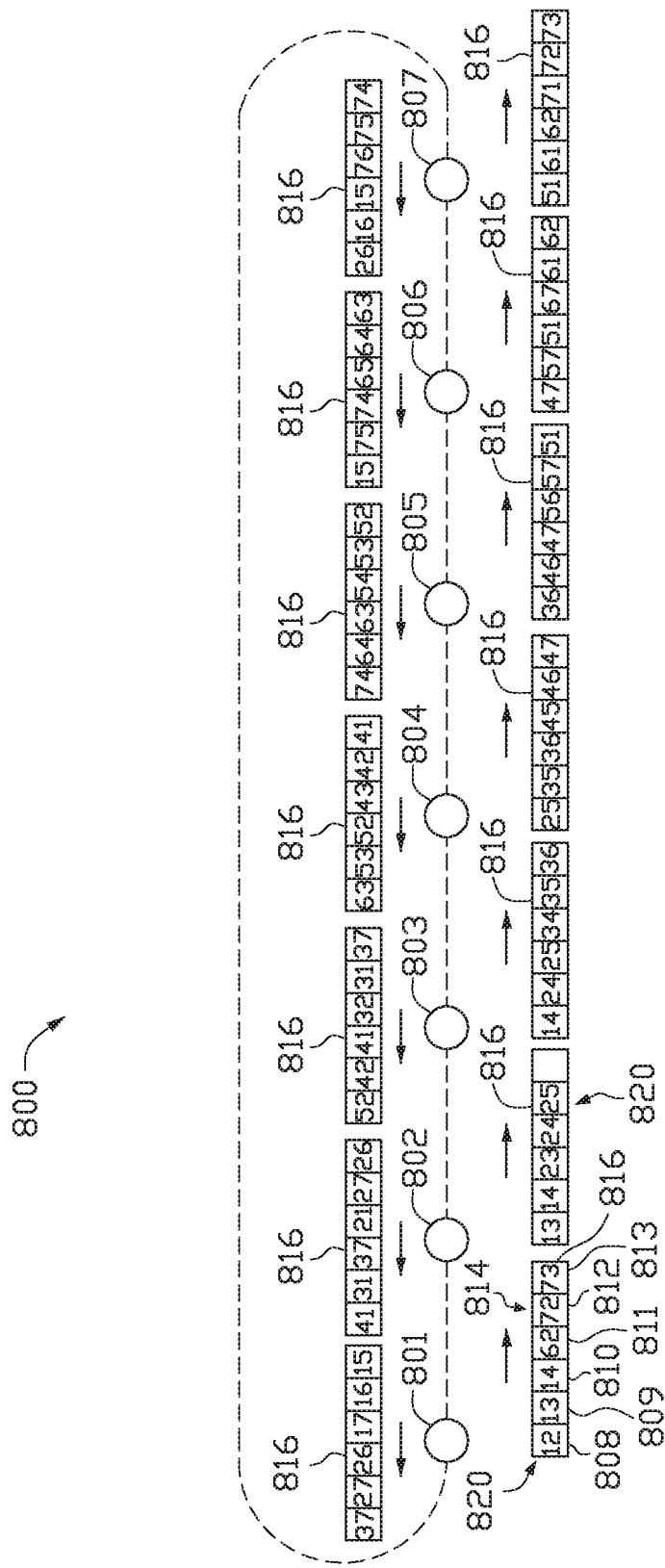
FIG. 8 illustrates an example of transferring data in a cloud computing network among hubs in a seven node ring, according to one embodiment.

FIG. 8 illustrates an example of communication ring 800 having seven processing nodes 801-807. A string 816 of information beginning at node 801 is sent among nodes 802-807. The string 816 includes six time slots 808, 809, 810, 811, 812, and 813 in each frame. In FIG. 8 only one frame, frame 814, is shown. Each time slot 808-813 is allotted a node pair for communication by a system manager. As the string 816 is sent among the processing nodes 801-807, a signal data frame (not shown) is sent simultaneously separate frames without a header. The allotted node pairs 820 are shown above each respective node 801-807 as the string 806 is sent among the processing nodes 801-807. By allotting each slot 808-813 a node pair, each node 801-807 does not have to make a decision regarding whether the time slot is allotted to that specific node.

Figure 9:
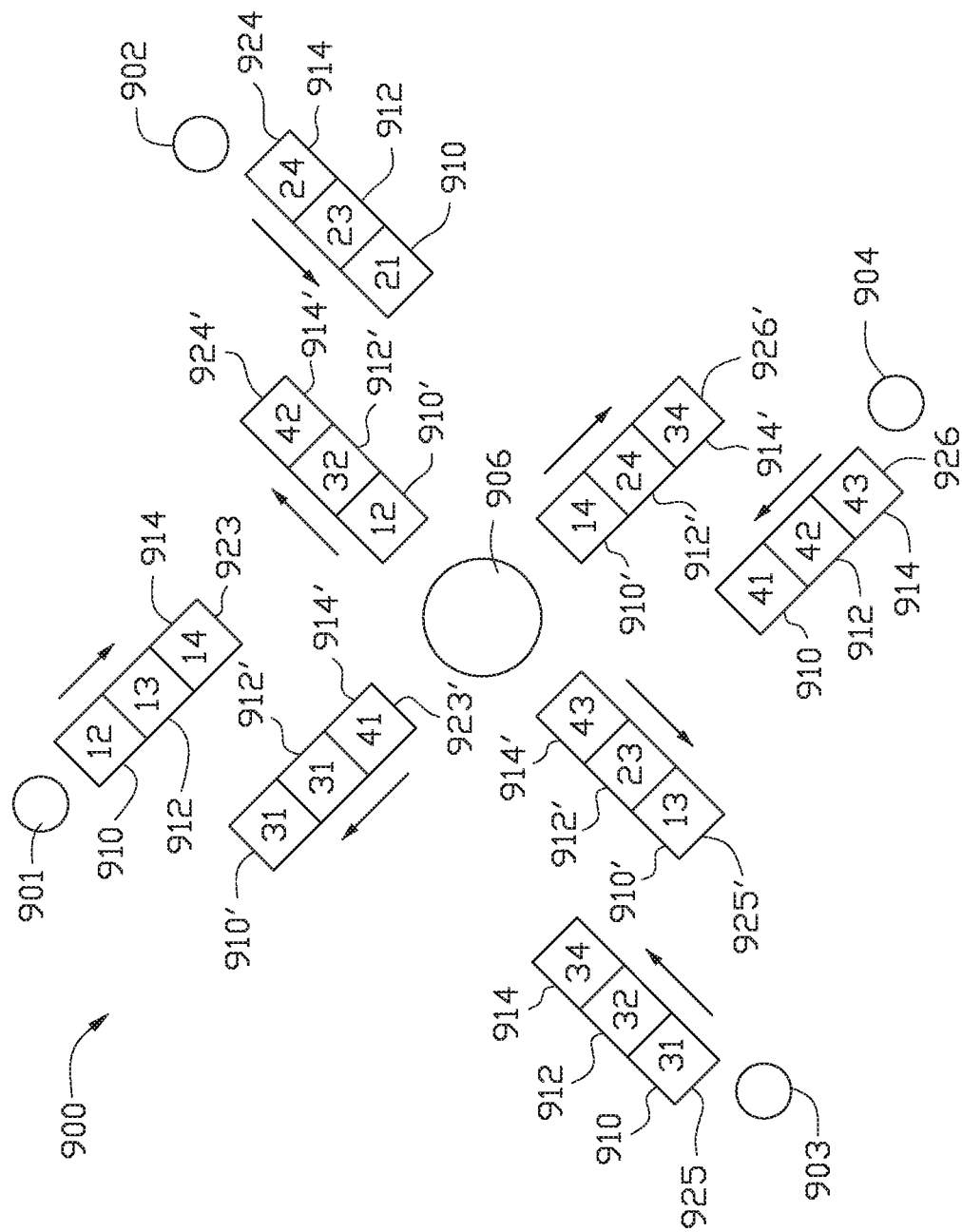
FIG. 9 illustrate an example of transferring data in a cloud computing network among four processing nodes ring with a hub, according to one embodiment.

FIG. 9 illustrates an example of transferring data in a cloud computing network among nodes in a motherboard configuration, according to one embodiment. FIG. 9 illustrates a communication ring 900 having four nodes 901, 902, 903, 904, and a central hub 906. The central hub 906 facilitates communication among the nodes 901-905. The central hub 906 receives strings 923, 924, 925, 926 of information from the nodes 901-904 and distributes the information to the correct node 901-904. The strings 923-926 of information contain a plurality of time slots for each frame in the string. Generally, for n-nodes in a communication ring similar to communication ring 900, the number of time slots needed is equal to n−1. Therefore, for communication ring 900, three time slots are needed. Each string 923-926 includes time slots 910, 912, 914 in each frame.

In string 923 sent from node 901 to hub 906, time slot 910 is assigned node pair 901,902; time slot 912 is assigned node pair 901,903; and time slot 914 is assigned node pair 901, 904. In string 924 sent from node 902 to hub 906, time slot 910 is assigned node pair 902, 901; slot 912 is assigned node pair 902,903; slot 914 is assigned node pair 902,904. In string 925 sent from node 903 to hub 906, time slot 910 is assigned node pair 903, 901; time slot 912 is assigned node pair 903, 902; time slot 914 is assigned node pair 903, 904. In string 926 sent from node 904 to hub 906, time slot 910 is assigned node pair 904, 901; time slot 912 is assigned node pair 904, 902; time slot 914 is assigned node pair 904, 903. As strings 923-926 are transmitted from the processing nodes to the hub 906, a signal data frame (not shown) is sent to separate frames of information in the strings 923-926.

The central hub 906 receives the strings 923-926 from the nodes 901-904. The central hub 906 determines which messages are meant for each respective node. The central hub 906 then sends strings of information to each respective node 901-904 with messages meant for that node. Central hub 906 sends string 923' to node 901. Time slot 910' is assigned node pair 902, 901; time slot 912' is assigned node pair 903, 901; and time slot 914' is assigned node pair 904, 901. Central hub 906 sends string 924' to node 902. Time slot 910' is assigned node pair 901, 902; time slot 912' is assigned node pair 903, 902; and time slot 914' is assigned node pair 904, 902. Central hub 906 sends string 925' to node 903. Time slot 910' is assigned node pair 901, 903; time slot 912' is assigned node pair 902, 903; and time slot 914' is assigned node pair 904, 903. Central hub 906 sends string 926' to node 904. Time slot 910' is assigned node pair 901, 904; time slot 912' is assigned node pair 902, 904; and time slot 914' is assigned node pair 903, 904. As strings 923'-926' are transmitted from the central hub 906 to the processing nodes 901-904, a signal data frame (not shown) is sent to separate frames of information in the strings 923'-926'.

Figure 10:
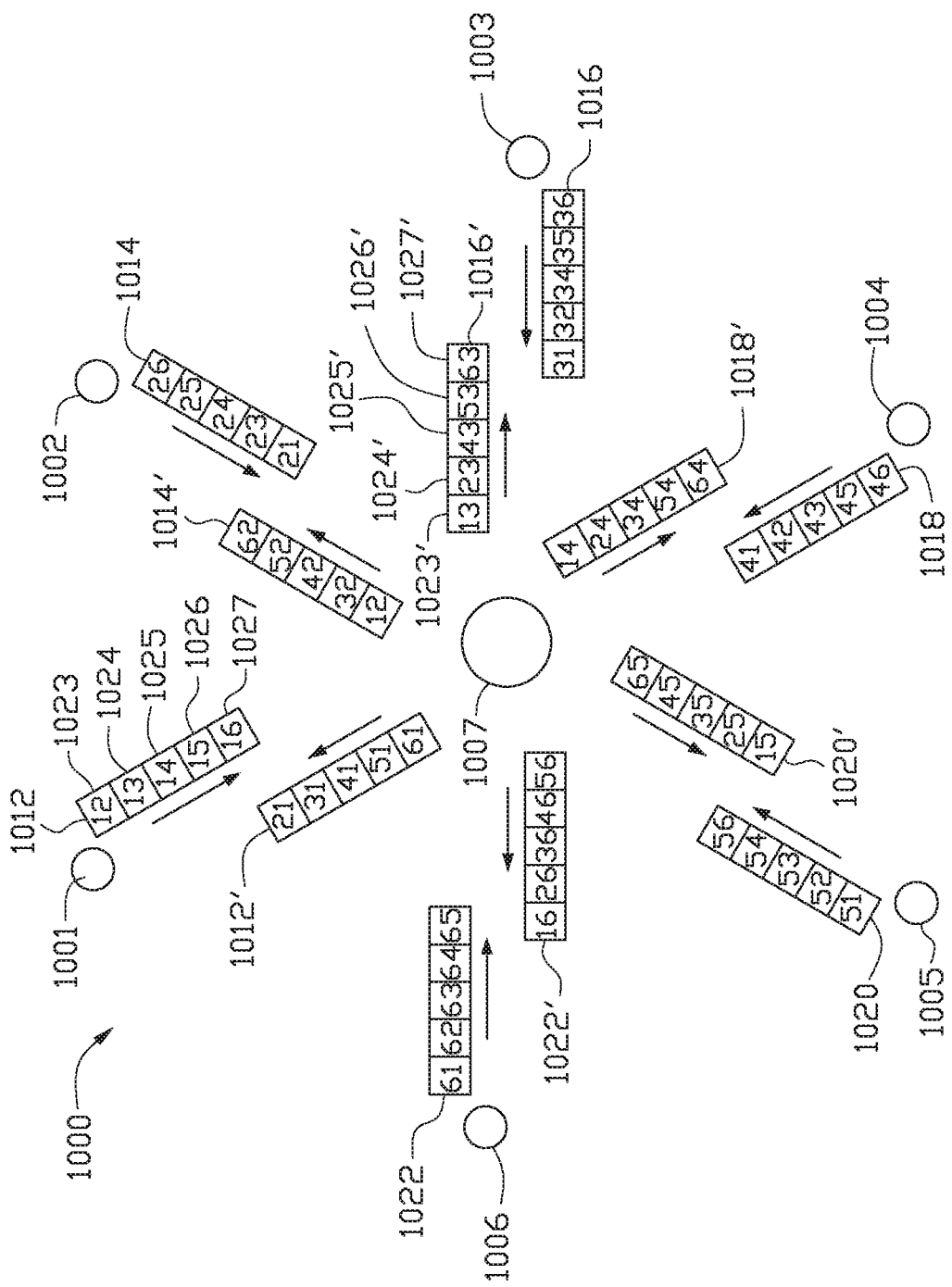
FIG. 10 illustrates an example of transferring data in a cloud computing network among six processing nodes and a hub, according to one embodiment.

FIG. 10 illustrates an example of transferring data in a cloud computing network among nodes in a motherboard configuration, according to one embodiment. FIG. 10 illustrates a communication ring 1000 having six nodes 1001, 1002, 1003, 1004, 1005, 1006, and a central hub 1007. The central hub 1007 is substantially similar to central hub 906. The central hub 1007 facilitates communication among the processing nodes 1001-1006. The central hub receives string 1012 from node 1001, string 1014 from node 1002, string 1016 from node 1003, string 1018 from node 1004, string 1020 from node 1005, and string 1022 from node 1006. Each string includes a plurality of time slots allotted to specific node pairs. For five nodes in a motherboard configuration, each frame includes five time slots 1023, 1024, 1025, 1026, and 1027. The node pairs allotted to the time slots 1023-1027 in each string 1012-1022 are denoted in FIG. 10. The signal data frame (not shown) is transmitted with each string 1012-1022 to the central hub 1007 as each string 1012-1022 is transmitted to separate frames of information.

After the central hub 1007 receives the strings 1012-1022 from the nodes 1001-1006, the central hub 1007 determines which messages are meant for each respective node. The central hub 1007 then sends strings of information to each respective node 1001-1007. Central hub sends string 1012' to node 1001; string 1014' to node 1002; string 1016' to node 1003; string 1018' to node 1004; string 1020' to node 1005; and string 1022' to node 1006. Each string includes a plurality of time slots 1023', 1024', 1025', 1026', and 1027' allotted to specific node pairs. The node pairs allotted to the time slots 1023'-1027' in each string 1012'-1022' are denoted in FIG. 10. The signal data frame (not shown) is transmitted with from the central hub 1007 to each respective node 1001-1007 as each string 1012'-1022' is transmitted to separate frames of information.

Embodiments disclosed herein aid in decreasing the latency in cloud computing networks by decreasing the connections from node to node in a communication ring. By decreasing the number of connections between each node, the cost of the overall system is also decreased as well. The skilled in the art will recognize that all discussion and figures illustrated two uni-directional communication channels to each point-to-point link, and that is done to support higher data rates.

The skilled in the art will also recognize that the time-slot based communication schemes taught in this document implies all the processing or routing nodes involved in relaying information will have been programmed to extracted data from an incoming data stream and either consume that data, if it is their intended destiny, or re-transmit those data inserting said data in specific outgoing time slots. This means time-slot position carries routing information, as the skilled in the art will recognize, and this also means routing information in the topologies discussed is a pre-programmable but fixed for the duration the designer of the topology intended to use the network for a desired processing job or task. In this sense, the time-slot based network of this document routes data in a pre-programmed functionality similar to what would have been achieved if an all-wired point to point network with physical wires would provide.

While the foregoing is directed to embodiments of the present disclosure, other and further embodiments of the disclosure may be devised without departing from the basic scope thereof, and the scope thereof is determined by the claims that follow.

What is claimed is:

1. A cloud computing network, comprising:
   a plurality of motherboards arranged in racks, where each individual motherboard comprises:
   a central hub; and
   a plurality of processing nodes equipped to the central hub, wherein each processing node is configured to access memory or storage space of another processing node in the same motherboard by intermediation of the hub, the access is called a communication between a pair of processing nodes, the communication is made on point-to-point electrical signaling comprising:
   a headerless string of information transmitted between processing nodes, wherein the string of information includes a plurality of information frames, and wherein each information frame includes a plurality of time slots, and wherein each time slot is allotted to a specific node pair; and
   a signal data frame transmitted simultaneously with the headerless string of information, wherein the signal data frame informs the processing nodes when a single information frame has been transmitted, wherein the central hub receives the headerless string of information, wherein the central hub distributes the headerless string of information to the correct processing node of the plurality of processing nodes, wherein the number of time slots of the plurality of time slots is equal to 1 less than the number of nodes of the plurality of processing nodes.

2. The cloud computing network of claim 1, wherein the communication is between a first processing node in a first motherboard and a second processing node in a second motherboard.

3. The cloud computing network of claim 1, wherein the communication further comprises:
   a signal data frame configured to be transmitted simultaneously with the string of information, wherein the signal data frame separates frames within the string.

4. The cloud computing network of claim 3, wherein a duration of the signal data frame is varied to indicate a presence or absence of an additional bit in the string of information, wherein the additional bit is carrying information related to an overlaid channel.

5. The cloud computing network of claim 4, wherein the overlaid channel is a management channel carrying configuration testing or information relevant to all servers in the cloud computing network.

6. The cloud computing network of claim 1, wherein the communication may be facilitated between a first hub in a first motherboard and a second hub in a second motherboard.

7. The cloud computing network of claim 5, wherein the hubs are arranged in a ring topology of point to point bidirectional links, each bi-directional link formed with two unidirectional point-to-point signaling lines.

8. The cloud computing network of claim 5, wherein the hubs are arranged in a line topology of point to point bidirectional links, each bi-directional link formed with two unidirectional point-to-point signaling lines.

* * * * *